(12) United States Patent
Sethuraman

(10) Patent No.: US 10,558,786 B2
(45) Date of Patent: Feb. 11, 2020

(54) MEDIA CONTENT ENCRYPTION AND DISTRIBUTION SYSTEM AND METHOD BASED ON UNIQUE IDENTIFICATION OF USER

(71) Applicant: Vijayakumar Sethuraman, Medurai (IN)

(72) Inventor: Vijayakumar Sethuraman, Medurai (IN)

(*) Notice: Subject to any disclaimer, the term of this patent is extended or adjusted under 35 U.S.C. 154(b) by 231 days.

(21) Appl. No.: 15/689,857

(22) Filed: Aug. 29, 2017

(65) Prior Publication Data
US 2018/0068092 A1 Mar. 8, 2018

(30) Foreign Application Priority Data
Sep. 6, 2016 (IN) .............................. 201641030392

(51) Int. Cl.
*G06F 21/10* (2013.01)
*H04L 29/06* (2006.01)
*H04L 9/30* (2006.01)
*G06F 21/31* (2013.01)

(52) U.S. Cl.
CPC .............. *G06F 21/10* (2013.01); *H04L 9/302* (2013.01); *H04L 63/0428* (2013.01); *G06F 21/31* (2013.01); *H04L 63/0823* (2013.01); *H04L 2463/101* (2013.01)

(58) Field of Classification Search
CPC ..................................................... G06F 21/10
See application file for complete search history.

(56) References Cited

U.S. PATENT DOCUMENTS

| 6,643,696 | B2  | 11/2003 | Davis et al. |
| 7,043,473 | B1  | 5/2006  | Rassool et al. |
| 8,713,168 | B2  | 4/2014  | Heffernan et al. |
| 8,862,503 | B2  | 10/2014 | Hayton et al. |
| 10,212,136 | B1* | 2/2019 | Gehret ................ H04L 63/0428 |
| 2004/0199654 | A1 | 10/2004 | Juszkiewicz |
| 2005/0086391 | A1 | 4/2005 | Chu et al. |
| 2005/0091164 | A1 | 4/2005 | Varble |
| 2005/0289072 | A1* | 12/2005 | Sabharwal .............. G06F 21/10 705/59 |

(Continued)

FOREIGN PATENT DOCUMENTS

EP        1976181        10/2008

OTHER PUBLICATIONS

Corresponding Comprehensive Patent Prior Art Search Report dated May 8, 2016.

*Primary Examiner* — Simon P Kanaan
(74) *Attorney, Agent, or Firm* — Belles Katz LLC

(57) ABSTRACT

A method and apparatus to identify user who purchased/downloaded audio/video content. When an audio/video content is purchased/downloaded the content is encrypted for the user and a unique identification code is added as part of the purchase/download. When the encrypted content is decrypted and assembled the identification code is converted to a spatial or time domain vector and added to the original content. The identification code can be split into individual digits/bytes to represent in spatial or time domain vector. The identification code can be visible or invisible. By examining the encoded original content, the user who purchased/downloaded the content can be identified from the unique identification code.

9 Claims, 4 Drawing Sheets

(56) References Cited

U.S. PATENT DOCUMENTS

| | | | |
|---|---|---|---|
| 2006/0204210 A1* | 9/2006 | Yanase | G06F 21/10 386/259 |
| 2007/0036353 A1* | 2/2007 | Reznik | H04B 7/0434 380/30 |
| 2008/0040354 A1 | 2/2008 | Ray et al. | |
| 2010/0011093 A1 | 1/2010 | Gordon | |
| 2012/0212405 A1 | 8/2012 | Newhouse et al. | |
| 2012/0265603 A1 | 10/2012 | Corner et al. | |
| 2013/0055410 A1 | 2/2013 | Knight et al. | |
| 2014/0214935 A1 | 7/2014 | Stevens et al. | |

\* cited by examiner

MEDIA CONTENT ENCRYPTION AND DISTRIBUTION SYSTEM AND METHOD BASED ON UNIQUE IDENTIFICATION OF USER

CROSS-REFERENCE TO RELATED APPLICATIONS

This application claims the benefit of Indian Application No. 201641030392, filed Sep. 6, 2016. The disclosure of the above application is incorporated herein by reference.

FIELD OF INVENTION

The present invention relates to security, acquisition, distribution and utilization for media content and, more specifically, to controlling download and playback of media content by applying encryption schemes for securely distributing data.

The present disclosure is primarily though not exclusively applied to audio and video contents with intellectual property rights. In the sense of the present disclosure, audio and video content with intellectual property rights is understood as a set of data in one or several digital files which can be played in an audio or video player and the use of which is protected by intellectual property rights.

BACKGROUND

As more and more people in world use computers, there becomes an increased need for security to control what data can be accessed, where and when people can access it, and which people are allowed any access to secure data. Copyrighted materials are of a particular area of interest as the media material objects such as records, tapes, and disks are now being replaced by digital media content. It has become common to store content such as songs and video in digital form.

In the world of printed documents and other physical content, a work created by an author is usually provided to a publisher, which formats and prints numerous copies of the work. The copies are then sent by a distributor to bookstores or other retail outlets, from which the copies are purchased by end users. While the low quality of copying and the high cost of distributing printed material have served as deterrents to unauthorized copying of most printed documents, it is far too easy to copy, modify, and redistribute unprotected digital works with high quality. Accordingly, mechanisms of protecting digital works are necessary to retain rights of the owner of the work.

Many systems exist for transferring and playing media content. If the content is valuable, the content owner will restrict access to the content. For example, a user might be granted access in exchange for payment. Once the user has accessed the content, however, it is relatively easy for the user to copy the content and transfer it to someone else, who can then play it freely. A content owner wants to restrict playback to authorized users without preventing these users from accessing and playing the content.

Content producers and distributors using the 'pay per view' or 'pay per download' content principle have been very negatively affected with the creation of P2P (Peer to Peer) networks, which allow exchanging files with content free of charge without the user who sees the content paying any price at all.

In modern P2P networks such as BitTorrent, there are no servers that can be shut down by enforcement agencies. There is not a single central point where the agencies can stop the operation of the network. In order to stop a pure P2P network, it is necessary to paralyze all its nodes or most of them, which greatly hinders the effectiveness of legal actions aimed at shutting down these networks.

Unfortunately, it has been widely recognized that it is difficult to prevent, or even deter, people from making unauthorized copies of electronic works within current general-purpose computing and communications systems such as personal computers, workstations, and other devices connected over communications networks, such as local area networks (LANs), intranets, and the Internet. Many attempts to provide hardware-based solutions to prevent unauthorized copying have proven to be unsuccessful. The proliferation of high band-width "broadband" communications technologies render it even more convenient to distribute large documents electronically, including video files such as full length motion pictures, and thus will remove any remaining deterrents to unauthorized copying and distribution of digital works. Accordingly, Digital Rights Management (DRM) technologies are becoming a high priority to help secure such content from unauthorized use.

One of the basic DRM schemes employed is the secure containers method. A "secure container", or simply an encrypted data method, offers a way to keep data contents encrypted until a set of authorization conditions are met and some copyright terms are honoured (e.g., payment for use). After the various conditions and terms are verified with the data provider, the data is released to the user. Clearly, the secure container approach provides a solution to protecting the data during delivery over insecure channels, but does not provide any mechanism to prevent legitimate users from obtaining the data and then using and redistributing it in violation of content owners' intellectual property.

A number of cryptographic techniques are available for use in encrypting data. For example, symmetric key techniques have been extensively used. With symmetric key arrangements, a first party encrypts data for a second party using a symmetric key. The second party decrypts the encrypted data using the same symmetric key. Symmetric-key systems require that the symmetric key be exchanged between the parties involved in a secure manner.

With public-key cryptographic systems such as the RSA cryptographic system, two types of keys are used—public keys and private keys. Data for a given party may be encrypted using the unique public key of that party. Each party has a corresponding private key that is used to decrypt the encrypted data.

Identity-based encryption schemes have also been employed. Such identity-based encryption schemes may use public parameters to encrypt data. These schemes are said to be "identity based," because user-specific identity information such as a particular user's email address is used as one of the inputs to the encryption algorithm. Each user has a unique private key based on the user's identity for decrypting encrypted data.

BRIEF DESCRIPTION OF DRAWINGS

The invention is best understood from the following description taken in conjunction with the accompanying drawings where.

DETAILED DESCRIPTION

Figure 1A:
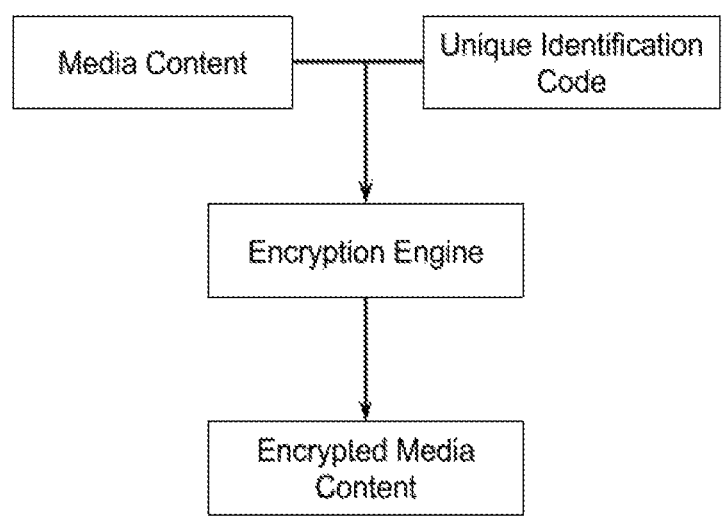
FIG. 1a and FIG. 1b provide broad level flow diagrams of the encryption process in accordance with an embodiment of the present disclosure.

The present method and system is described in detail below with reference to several embodiments and examples. Such discussion is for purposes of illustration only. Modifications to examples within the spirit and scope of the present application will be readily apparent to one of skilled in the art. Terminology used throughout the specification herein is given its ordinary meaning as supplemented by the discussion immediately below. As used in the specification, the singular forms "a", "an" and "the" include plural references unless the context clearly dictates otherwise.

In accordance with the present disclosure, a system is provided for distributing content securely using either symmetric or asymmetric encryption scheme. In the encryption algorithm used with this scheme, a unique identification code is added along with the media content during encryption. The unique identification code is then represented in a different domain when the media content is viewed or played.

Unlike the existing encryption techniques, instead of employing a separate secure container for encrypting the content, the content itself is encrypted by incorporating a unique identification code with the media content. This provides a tamper proof way for sharing a unique identification code. This unique identification code act as input that is specific to each user or for each purchase. The system may be used to distribute content such as digitally-encoded movies and videos, digitally-encoded songs, digital books and magazines, or any other suitable content.

A content provider may generate the data to be distributed which may be packaged to suitably encrypt the data with the unique identification code using an encryption engine. Encryption engine takes the data to be encrypted and produces corresponding encrypted data. The data that is to be encrypted may have associated attributes such as rating, date, title, owner name, price, etc. as part of the data itself. If desired, the data packaging service can place the attributes into the data structure with the data to be encrypted. A data structure type (e.g., "movie") may be associated with the data structure.

Some or all of the attributes associated with the data to be encrypted may be used as policy information to regulate access to the data once it has been encrypted. In general, the particular attributes that are associated with any given data depend on the type of data involved.

In accordance with an aspect of the present disclosure, the method comprises of splitting the unique identification code into bits and pieces to represent in a time or spatial domain. This way when a user purchases or downloads a media content, say Audio or Video, the user can be identified from the downloaded content in a unique way.

When the encrypted content is decrypted and assembled, the identification code is converted to a spatial or time domain vector and added to the original content. The identification code can be split into individual digits or bytes to represent in spatial or time domain vector. The converted identification code can be visible or invisible. By examining the encoded original content, the user who purchased or downloaded the content shall be identified from the unique identification code.

The content in the encrypted data may not be accessed without first decrypting the data. This may be accomplished only through use of an appropriate decryption engine capable to decrypt the content for a particular user. A user who has obtained given encrypted data may be granted access to the content in the encrypted data by use of a decryption engine. The user may use a decryption engine to decrypt the encrypted data and thereby access and use the data in a decrypted and unique identification code encoded form.

The decryption engine may be provided as a stand-alone software implemented on the user's equipment or may be built into or work in conjunction with other user software or an individual hardware to handle the decryption functionality. For example, a media player suitable for playing back videos and audio files may be implemented on the user's equipment. The decryption engine functions may be incorporated into the media player or may be automatically invoked by the media player when the user desires to play back or view certain content.

In an embodiment, the disclosed system of encrypted media content delivery can be made more flexible. In this scenario, instead of encrypting the media content with the UIC itself which restricts the content to a particular user to which the UIC belongs, instead, public and private key RSA encryption can be utilized. The RSA key required for decrypting the content can be delivered to the user separately through a secure channel while the UIC which is generated will be added, or appended to the content itself. In the decryption side, the unique identification code will be extracted and used for accessing the content. In this case, the unique identification code can be unique across each download and per user.

In an embodiment of the present application, when there is a Digital Rights Management (DRM) and/or encryption involved in media content delivery, a separate encryption to protect the media content and UIC can be avoided. Instead the UIC can be split and converted into time or spatial domain vector and applied to the media content before delivery. As the UIC is converted and applied to the media content before transmission tampering of the UIC is protected. The encryption mechanism available will act as an additional protection to protect the media content and the converted UIC.

Figure 1B:
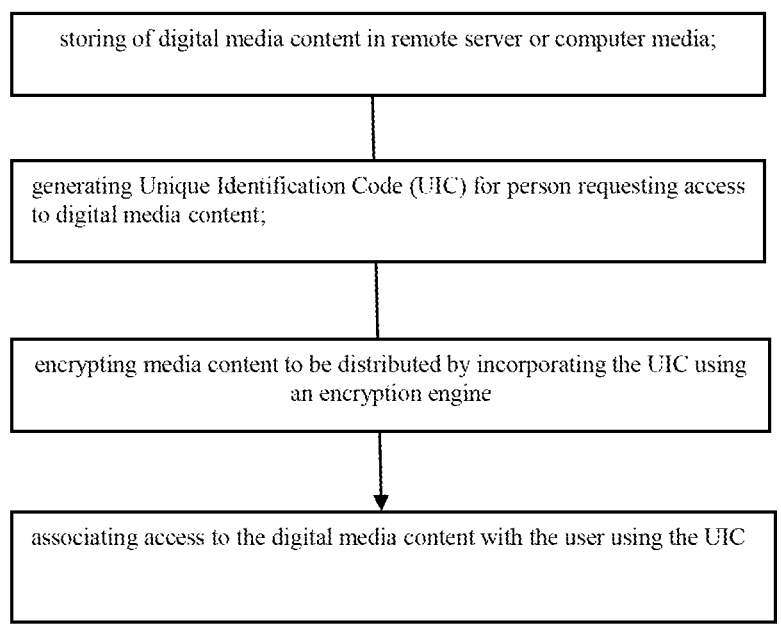

Referring now to the appended figures, FIG. 1 (a and b) depict the broad level flow of the encryption mechanism wherein the media content and the unique identification code are disposed into an encryption engine to create encrypted media content.

Figure 2A:
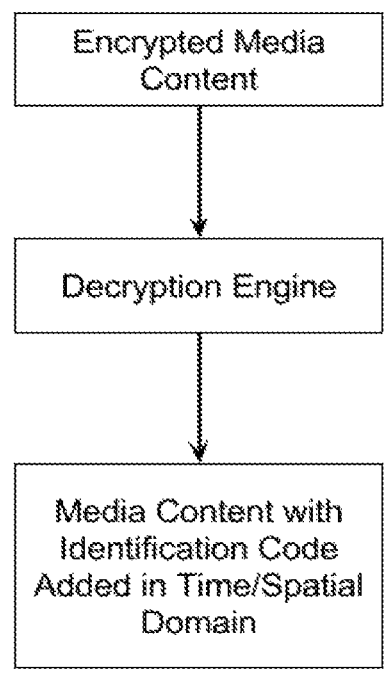
FIG. 2a and FIG. 2b provide broad level flow diagrams of the decryption process in accordance with an embodiment of the present disclosure.
Figure 2B:
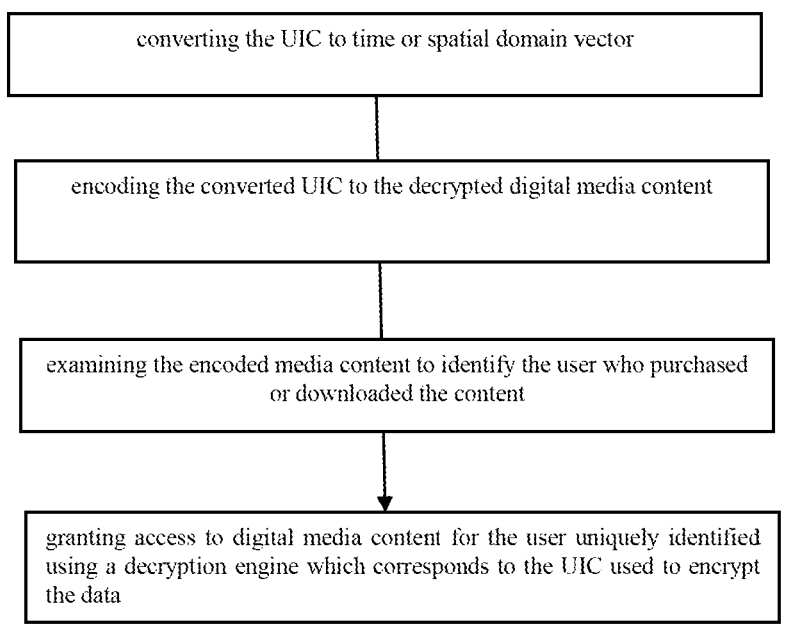

FIG. 2 (a and b) depict the broad level flow of the decryption process wherein the encrypted media content goes through the decryption engine which leads to decrypted media content with unique identification code added to time or spatial domain.

An advantage of the present encryption content distribution approach is that the user can be identified from the downloaded or purchased content in a unique way.

The detailed description has been described herein with reference to a particular embodiment for a particular application. Those having ordinary skill in the art and access to the present teachings may recognize additional various substitutions and alterations are also possible without departing from the spirit and scope of the present disclosure.

The invention claimed is:

1. A method of digital media content distribution comprising the steps of:
   a. storing of digital media content in remote server or computer media;

b. generating Unique Identification Code (UIC) for person requesting access to digital media content;
c. encrypting media content to be distributed by incorporating the UIC using an encryption engine;
d. associating access to the digital media content with the user using the UIC
e. converting the UIC to time or spatial domain vector;
f. adding the converted UIC to the decrypted digital media content;
g. examining the encoded media content to identify the user who purchased or downloaded the content; and
h. granting access to digital media content for the user uniquely identified using a decryption engine which corresponds to the UIC used to encrypt the data.

2. The method as claimed in claim 1, further comprising the steps of
a. associating data to be encrypted with attributes such as rating, date, title, owner name and such like;
b. placing the attributes into the data structure with data to be encrypted; and
c. associating a data structure type with the data structure.

3. The method as claimed in claim 1 wherein RSA encryption is utilized comprising the steps of:
a. encrypting digital media content using public and private key RSA encryption;
b. delivering the RSA key to the user through secure channel;
c. generating and appending the UIC with the content to be delivered;
d. decrypting the content at the user side using the RSA key; and
e. extracting the UIC and accessing the content.

4. The method as claimed in claim 1 wherein the UIC is split into individual digits or bytes to represent in spatial or time domain vector.

5. The method as claimed in claim 1 wherein the converted UIC is visible or invisible.

6. The method of claim 1 wherein the decryption engine is implemented on or built into user's equipment.

7. The method of claim 1 wherein decryption engine functions are incorporated into the user's digital media player.

8. The method of claim 1 wherein decryption engine is automatically invoked by the digital media player when the user desires to playback or view certain content.

9. A system for digital media content distribution, comprising of:
a. Remote central server; wherein the central server further comprises of:
  i. Memory for storing of data; and
  ii. a processor configured to:
    generate Unique Identification Code (UIC) for a user requesting access to digital media content;
    encrypting data by incorporating UIC using an encryption engine;
    verify and assign access to encrypted media content based on authentication of user;
b. Communication link for transfer of data; and
c. Media content decryption, comprising of
  i. Receiving and storing the encrypted media content; and
  ii. a processor configured to
    Decrypt the received encrypted media content using the key received securely through a different channel;
    Extracting the Unique Identification Code (UIC) incorporated along with the media content;
    Converting the UIC to time and spatial domain vector;
    Splitting the UIC into bits and pieces to represent in time and space domain; and
    Encoding the converted and split UIC with the decrypted media content;
    Accessing the media content with the use of the UIC;
d. Display/information retrieval device communicatively coupled by said communication link to said central server.

* * * * *